(12) United States Patent
Kulisch

(10) Patent No.: US 7,048,959 B1
(45) Date of Patent: May 23, 2006

(54) KINETIC BEVERAGE FOR DELIVERY OF PHYSIOLOGICALLY ACTIVE SUBSTANCES

(76) Inventor: Michael A. Kulisch, 16232 Saratoga St., #4, San Leandro, CA (US) 94578

( * ) Notice: Subject to any disclaimer, the term of this patent is extended or adjusted under 35 U.S.C. 154(b) by 229 days.

(21) Appl. No.: 10/340,433

(22) Filed: Jan. 9, 2003

(51) Int. Cl.
*A23L 2/38* (2006.01)

(52) U.S. Cl. .................................. 426/590; 426/573

(58) Field of Classification Search ............ 426/591, 426/590, 576, 577, 101, 112, 89, 103, 555, 426/289
See application file for complete search history.

(56) References Cited

U.S. PATENT DOCUMENTS

| | | | | |
|---|---|---|---|---|
| 2,278,466 | A | * | 4/1942 | Musher ................ 426/89 |
| 5,824,339 | A | | 10/1998 | Toshihiro et al. |
| 5,912,012 | A | | 6/1999 | Carlin et al. |
| 5,925,378 | A | | 7/1999 | Carnazzo |
| 6,294,579 | B1 | | 9/2001 | Carnazzo |
| 6,319,535 | B1 | | 11/2001 | Shaw |

OTHER PUBLICATIONS

Internet Reference downloaded from www.yummibears.com/store/index.cfm on Apr. 2, 2003. Hero Nutritionaal Products, "Product Catalogue", 2002.

* cited by examiner

*Primary Examiner*—Carolyn Paden
(74) *Attorney, Agent, or Firm*—Foothill Law Group, LLP; Howard E. Lebowitz

(57) ABSTRACT

The invention pertains to a delivery system for delivery of at least one physiologically active ingredient in a pleasant and palatable manner. One preferred embodiment is a beverage mix comprising a plurality of morsels, each morsel comprising a gelatinous core, a plurality of effervescent zones, at least one barrier zones, wherein the at least one barrier zone temporarily protects the plurality of effervescent zones. When a beverage is immersed in water, the barrier zone prevents water reaching the effervescent zone. The at least one barrier zone deteriorates exposing the effervescent zones in sequence. The effervescent zones dissolve and carbon dioxide gas is released. Gas bubbles coat the morsel and it rises. When the gas bubbles disengage from the morsel, the morsel falls. The process repeats until all of the effervescent zones are exposed. The drink comprising gelatinous cores in carbonated water is ready for consumption.

24 Claims, 3 Drawing Sheets

KINETIC BEVERAGE FOR DELIVERY OF PHYSIOLOGICALLY ACTIVE SUBSTANCES

BACKGROUND OF THE INVENTION

1. Field of the Invention

The invention pertains to ingestion of physiologically active ingredients, and more particularly to compositions and methods relating to delivery of physiologically active ingredients in a pleasant manner using an effervescent agent.

2. Description of the Prior Art

In recent years, the use of vitamins and nutritional supplements has skyrocketed. These products are generally presented to the consumer in common forms such as capsules and tablets, but beverages have also become a popular delivery medium. Beverages containing vitamins, nutritional supplements, and/or physiologically active ingredients often have strong flavoring to mask the unpleasant taste of the active ingredients they contain, which can reduce enjoyment of the beverage.

A significant portion of the population has a difficulty swallowing tablets and capsules of physiologically active substances. Many physical conditions, such as a sore throat, inhibit an individual's ability to swallow a tablet or capsule containing physiologically active substances.

The efficacy of effervescent delivery systems for medicaments such as analgesics is well known in the art. These formulations generally comprise an effervescent, one or more active ingredients, and fillers, binders, and flavors compounded into a powder or tablet which decomposes into water soluble ingredients when mixed with water to form a carbonated drink which is consumed. Effervescent powders and tablets have been shown to improve the solubility and bio-availability of nutrients such as amino acids when the nutrient and the effervescent are mixed into water. U.S. Pat. Nos. 6,294,579 and 5,925,378, both of which are hereby incorporated herein by reference, deal respectively with effervescent delivery systems for tyrosine and creatine.

Inclusion of vitamins and other nutritional supplements into candy like gelatin figures is known in the art, a popular brand being sold as Yummi Bears™, a product of Hero Nutritional Products.

U.S. Pat. No. 5,824,339, which is hereby incorporated herein by reference, "Effervescent composition and its production", discloses an effervescent composition comprising a core-shell powder, consisting of a fine granular core spray coated with a liquid mixture containing a water-soluble polymer and at least one physiologically active substance and an enteric coating film; an effervescing component and an auxiliary effervescing agent, which provides for controlled release of the physiologically active substance and is useful for preparing uniform solution or suspension having a refreshing sensation on ingestion.

U.S. Pat. No. 6,319,535, which is hereby incorporated herein by reference, discloses confections that 'swim' in a carbonated beverage, describing gelatin confections that are have a hydrodynamic design which allows the confections to repeatedly rise and fall due to attachment and detachment of gas bubbles that are already present in a carbonated beverage.

While there are a plethora of delivery systems available for delivery of physiologically active substances, there continues to be new forms introduced that purport to be palatable and will encourage regular consumption. Yet it is widely recognized that children, in particular, as well as adults, need considerable encouragement to take these often ill tasting substances and that there is a need for an improved delivery system for physiologically active substances which provides a pleasant and palatable presentation which encourages the consumption of the substances.

There is a need for a pleasant and palatable presentation of a wide range of physiologically active substances, including both water soluble and insoluble substances which in themselves have an unpleasant taste.

There is a need for an effervescent delivery system that combines the benefits of effervescent delivery of water-soluble components with concomitant delivery of other active ingredients in a solid form.

SUMMARY OF THE INVENTION

An object of the invention is to provide compositions and methods for delivery of physiologically active substances in a pleasant and palatable form that encourages their consumption.

A further object of the invention is to provide compositions and methods that can be applied to delivering a wide range of different physiologically active substances.

A further object of the invention is to provide a beverage mix for delivering a dose of at least one physiologically active ingredient in a pleasant and palatable way, A further object of the invention is to provide a palatable and pleasant delivery vehicle whereby a dose comprising at least one water soluble component and at least one water insoluble component can be delivered as a single measured unit wherein the water soluble component is ingested in an effervescent solution and the water insoluble component is ingested in a palatable solid form.

The invention pertains to a beverage mix comprising a plurality of morsels. A morsel is the basic unit of a composition according to the invention. A morsel comprises a gelatinous core, at least one effervescent zone, and at least one barrier zone outside of the gelatinous core, wherein each barrier zone protects at least one effervescent zone. In one preferred embodiment the morsel comprises a gelatinous core surrounded by a plurality of concentric layers. The gelatinous core comprises at least one gel forming substance and at least one physiologically active substance, the at least one physiologically active substance being either dissolved or dispersed in the gel forming substance. The plurality of layers comprise barrier type layers and effervescent type layers. Effervescent type layers comprise a material which releases gas bubbles when exposed to liquid water.

Barrier type layers comprise materials that protect an effervescent type layer for a limited period of time while the morsel is immersed in water. The layers are applied in alternating sequence. Morsels, preferably, have a diameter in the range from about 0.1-mm to about 10-mm, and preferably have a specific gravity greater than that of water.

After a morsel is placed in water, a first effervescent layer is revealed. A first barrier layer may optionally be present outside the first effervescent layer, in which case the first barrier layer disintegrates to reveal the first effervescent layer. The first effervescent layer reacts with the water forming gas bubbles, at least one of which coats or adheres to the remainder of the morsel. The morsel rises due to the buoyancy imparted by the attached gas. When the morsel reaches the top the attached gas disengages and the morsel sinks. The process is repeated layer by layer until the morsel core is revealed A dose comprises at least one morsel, preferably a plurality of morsels, and more preferably a multiplicity of morsels. When the dose is dropped into a glass of water, there is an exciting dynamic display as the morsels rise and fall and the mixture seem to boil due to the effervescence. The excitement can be enhanced by the addition of colorants to at least one of the layers.

When the action is completed, the beverage, now comprising morsel cores in water, is ready for consumption. In a preferred embodiment, the morsel cores preferably have a firm but jelly-like gelatinous texture and are capable of being swallowed effortlessly with the water. Flavors may be added to the layers to improve the taste of the drink. Some people may prefer to consume the beverage while at least some of the morsels are still in action, that is they still contain some effervescing material.

In an alternative embodiment, the morsels comprise a gelatinous core surrounded by a plurality of nodules each of which are attached to the exterior surface of the gelatinous core. Each nodule comprises an effervescent interior portion and a barrier portion that temporarily protects the effervescent inner portion when the morsel is immersed in water. In this case the thickness of the protective portion varies from nodule to nodule such that various effervescent portions are exposed after different periods of time allowing the morsels to rise and fall. Otherwise the effervescent inner portions and barrier portions are equivalent to effervescent type layers and barrier type layers.

In the preceding discussion use of the beverage mix was discussed in terms of placing the morsels into water. It should be understood that this is not limited to pure water, but may include any water based beverages, such as carbonated soft drinks or non-carbonated drinks.

Additional water-soluble physiologically active substances may optionally be added to the layers, such that they will be dissolved into the water when the layers disintegrate. This can be particularly advantageous as it allows for introducing a physiologically active substance that is preferably introduced in solution form in the layers, in the same dose with a dispersed solid or dissolved physiologically active that is part of the core. Thus both physiologically active substances are introduced in their preferred delivery form within a single convenient dose.

Morsels are preferably globose, but may also have realistic or fanciful shapes that add interest to the dynamic presentation, including unusual shapes such as bow ties, strings, and ribbons.

The core and the layers may contain fillers, binders, and excipients that provide bulk and texture.

BRIEF DESCRIPTION OF THE DRAWINGS

These and other features, aspects and advantages of the present invention will become better understood with regard to the following description, appended claims and accompanying drawings, where:

DESCRIPTION OF THE PREFERRED EMBODIMENT

The invention pertains to a beverage mix comprising a plurality of morsels. A morsel is the basic unit of a composition according to the invention. A morsel comprises a gelatinous core, at least one effervescent zone and at least one barrier zone, wherein the at least one effervescent zone and the at least one barrier zone are outside of the gelatinous core and the at least one barrier zone protects at least one effervescent zone.

The beverage mix is intended to be deployed in water for consumption. It is not necessary that pure water is used, and any water-based beverage is suitable for deployment of the beverage mix. Examples of suitable water based beverages include carbonated soft drinks and non-carbonated beverages. Within this application wherever reference is made to placing the beverage mix or morsels in water it should be understood that any water based beverage may be used in place of simply water.

In one preferred embodiment the morsel comprises a gelatinous core surrounded by a plurality of concentric layers. The gelatinous core comprises at least one gel forming substance and at least one physiologically active substance, the at least one physiologically active substance being either dissolved or dispersed in the gel forming substance. The plurality of layers comprise at least one barrier type layer and at least one effervescent type layer. Effervescent type layers comprise a material which releases gas bubbles when exposed to liquid water. Barrier type layers comprise materials that protect an effervescent type layer for a limited period of time while the morsel is immersed in water. The layers are applied in alternating sequence, such that effervescent layers are protected by a barrier layers. One exception is that in some embodiments it may be preferred to have the outside layer be an effervescent layer. A more preferred embodiment comprises a plurality of effervescent layers, and most preferably a plurality of barrier layers.

Figure 1:
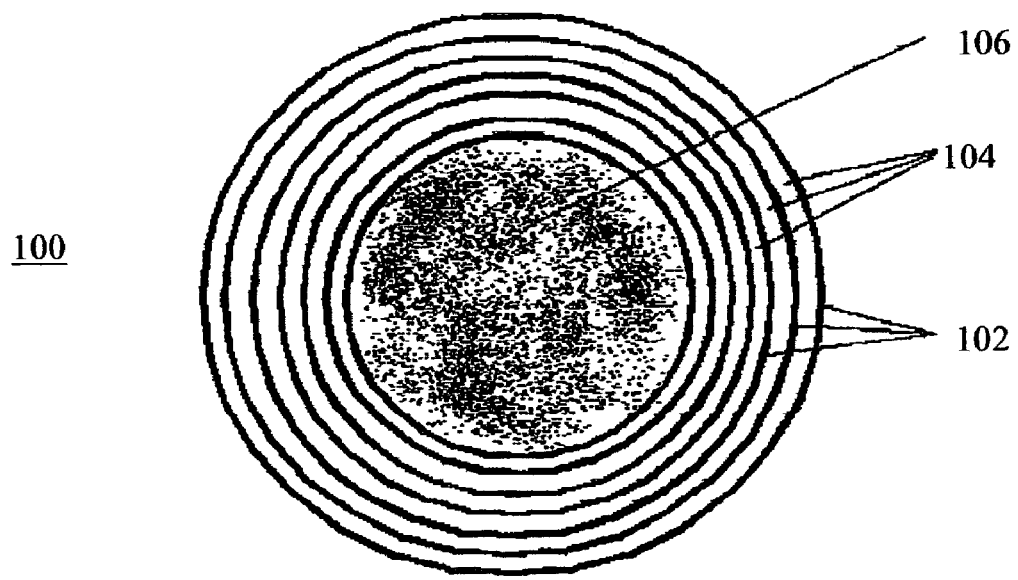
FIG. 1 is a cross section of a spherical morsel with concentric layers.

Referring to FIG. 1, a morsel 100 is shown comprising barrier layers 102, effervescent layers 104 and a gelatinous core 106 containing physiologically active ingredients in a gel base.

After a morsel is placed in water, a first effervescent layer is revealed. A first barrier layer may optionally be present outside the first effervescent layer, in which case the first barrier layer disintegrates to reveal the first effervescent layer. The first effervescent layer reacts with the water forming gas bubbles, at least one of which coats or adheres to the remainder of the morsel. The morsel rises due to the buoyancy imparted by the attached gas. When a morsel reaches the top the attached gas disengages and the morsel sinks. The process is repeated layer by layer until the morsel core is revealed. In the case of a morsel having only one effervescent layer the morsel will only rise once.

A dose of the beverage mix includes enough morsels to provide the desired quantity of the at least one physiologically active substance. A dose comprises at least one morsel, preferably a plurality of morsels, and more preferably a multiplicity of morsels. When the dose is dropped into a glass of water, there is an exciting dynamic display as the morsels rise and fall and the mixture seem to boil due to the effervescence. The excitement can be enhanced by the addition of colorants to at least one of the layers.

When the action is completed, the beverage, now comprising morsel cores in water, is ready for consumption. In a preferred embodiment, the morsel cores preferably have a firm but jelly-like gelatinous texture and are capable of being swallowed effortlessly with the water. Flavors may be added to the layers to improve the taste of the drink. It will be recognized that some people will prefer to consume the beverage while at least some of the morsels are still effervesing.

Figure 2:
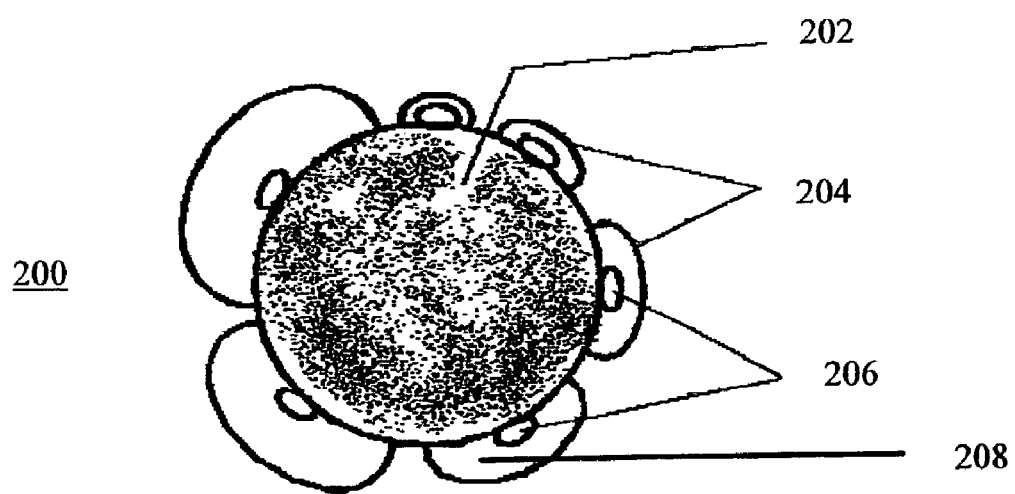
FIG. 2 is a cross section of a morsel with nodules.

FIG. 2 shows an alternative embodiment in which a morsel 200 comprises a gelatinous core 202 surrounded by a plurality of nodules 204 each of which are attached to the exterior surface of the gelatinous core. Each nodule comprises an effervescent interior portion 206 and a barrier portion 208 that temporarily protects the effervescent inner portion when the morsel is immersed in water. In this case the thickness of the protective portion varies from nodule to nodule such that various effervescent portions are exposed after different periods of time allowing the morsels to rise and fall. Otherwise the effervescent inner portions and barrier portions are equivalent to effervescent type layers and barrier type layers.

Figure 3:
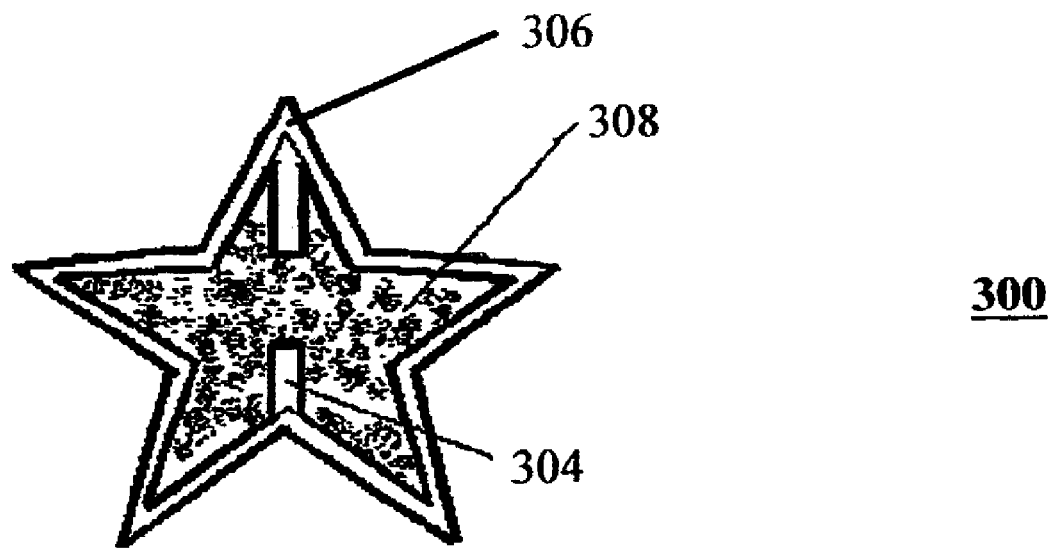
FIG. 3 is a cross of a star shaped morsel.
Figure 3:
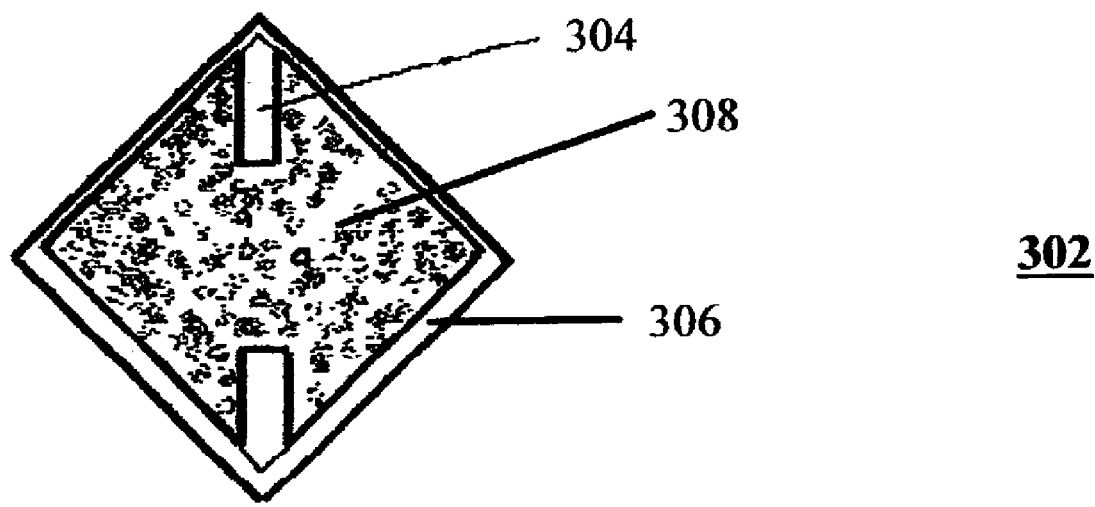

Morsels are preferably globose, but may also have realistic or fanciful shapes that add interest to the dynamic presentation. FIG. 3 shows a morsel 300 in the shape of a star and another morsel 302 in the shape of a diamond. Morsels 300 and 302 illustrate another alternative configuration having pocket effervescent zones 304 that are partially surrounded by the core 308 and shielded by barrier zone 306. Of course, these non-globose shaped morsels can be made with concentric layers or nodules as in FIG. 1 or FIG. 2.

Figure 4:
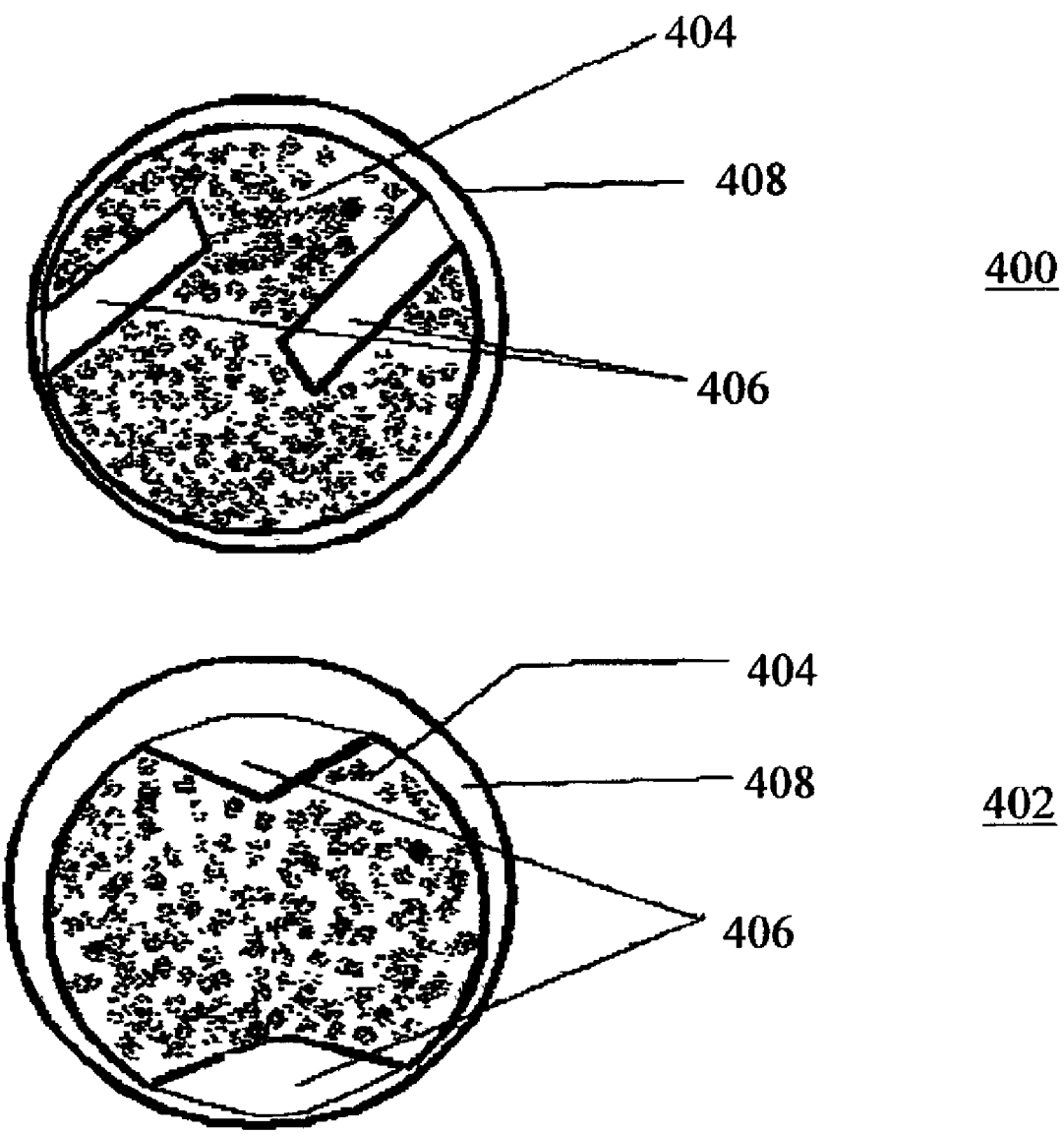
FIG. 4 is a cross section of a cubic morsel.

FIG. 4 shows still another embodiment of morsels, 400 and 402, where the effervescent zones 406 are pockets that are surrounded by the gelatinous core 404 and a the barrier zone 408 which is applied non-concentrically so that it is thicker on one side than the other such that the pockets are exposed at different times after the morsels are immersed in water.

A beverage can comprise morsels of a single style or in the alternative may comprise a combination of styles, for example spherical concentric, spherical nodules, star concentric, star with concentric and pocket zones alone or in mixture. A mixture of styles makes a more interesting and exciting presentation.

Additional water-soluble physiologically active substances may optionally be added to the zones or layers, such that they will be dissolved into the water when the layers disintegrate.

The addition of water-soluble physiologically active substances to the zones or layers can lead to a particularly advantageous embodiment of the invention, because it allows for delivery of two or more different physiologically active substances in two different modes within the same controlled dose. For example, it is possible to deliver a first component as a solid powder dispersed or dissolved within the core, and a second water-soluble component mixed with one or more effervescent layers or zones When the morsel is placed in water, the water-soluble component ends up dissolved in the carbonated water while the other components remain in the core. Thus two modes of delivery are possible within one dose. One advantage of this embodiment is that the second water soluble component is made available immediately while the first component is delayed, It will appreciated in the preceding description that the first component and second component are not necessarily individual substances but may each be a combination of substances.

An example of the embodiment is a combined cardio-beneficial supplement comprising the water soluble amino acid 1-arginine and a group of antioxidants, vitamins and minerals. The 1-arginine is mixed with the effervescent layers and the antioxidants, vitamins and minerals are mixed into the gelatinous core. When the beverage is finally consumed the 1-arginine is consumed as a solution in carbonated water while the other components are either dissolved or dispersed in the gelatinous core.

The core comprises at least one gel forming substance. Preferred gel forming materials include such gel forming substances as gelatin, gelatin substitutes such as modified vegetable starch, water-soluble cellulosic polymers, pectin, plasticizers such as glycerol or sorbitol or other polyols, polysaccharides such as agar, carrageenan, glucomannan, scleroglucan, schizophyllan, gellan gum, alginic acid, curd, and mixtures of these and other substances well known in the art for making gelatinous confections such as gummy articles. The core further comprises at least one physiologically active substance either dispersed as a powder or dissolved in the at least one gel forming substance. The core can also contain binders, fillers, and excipients which improve its properties such as those which are listed in "Inactive Ingredient Guide", published by the United States Food and Drug Administration, Center for Drug Evaluation and Research, Office of Management, in January 1996, which is hereby incorporated herein by reference. The important characteristic of the core is that it has a firm jelly-like texture that can be easily swallowed while maintaining its integrity for at least one minute and preferably several minutes while submersed. Processed gelatin such as a gummy confection will meet the criteria, even though such an item slowly absorbs water and swells over a longer period of several hours.

Effervescent materials include substances that dissolve or decompose to release gas bubbles in water, preferably carbon dioxide. Suitable effervescent materials include such compounds as alkali metal carbonates (e.g. sodium carbonate, potassium carbonate, etc.), alkali metal hydrogen carbonates (e.g. sodium hydrogen carbonate, potassium hydrogen carbonate, etc.), and ammonium carbonate can be employed. Among preferred effervescing agents are sodium carbonate, sodium hydrogen carbonate, and ammonium carbonate. An effervescent layer comprises at least one effervescent material, said at least one effervescent material optionally mixed with other materials.

Barrier layers comprise materials applied to a morsel to temporarily protect an underlying effervescent layer. A thin layer of pharmaceutical shellac is a suitable barrier layer. Even though shellac is not water-soluble a thin layer does not perfectly coat the effervescent and quickly disintegrates to reveal the underlying effervescent layer. A barrier can also be applied comprising materials which could be used for the gelatinous core and such materials as are found on the FDA approved coatings list or mixtures thereof, including but not limited to gelatin, pectin, gellan gum, ethylcellulose, control release polymers, water-soluble polymers (e.g. IBC, HPMC, etc.), polymers of acrylic and methacrylic esters, ethylcellulose, hydroxymethylcellulose, hydroxypropylcellulose, polyoxyethylene glycol (e.g. Macrogel 6000), Tween 80, Pluronic F68, castor oil, cellulose acetate phthalate, hydroxypropylmethylcellulose phthalate, hydroxymethyicellulose acetate succinate, acrylic copolymers (e.g. Eudragit L30D-55), carboxymethylethylcellulose, polyvinyl acetal diethylaminoacetate, wax, talc, titanium dioxide, red iron oxide, titanium dioxide, gum arabic, resin, ethocel 20, glycerol monostearate. The materials may be used alone or in combinations. A barrier layer must temporarily protect an underlying effervescent layer so that the effervescent layers are exposed approximately sequentially. The barrier effect may be the result of a combination of the physical or chemical nature of the materials in a barrier layer, to the thickness of the layer, and the tightness of packing of the layer.

Physiologically active ingredients comprise all substances that are desired for administration to a person for their value or purported value as medicaments or nutritional supplements, including all substances administered for diagnosis, treatment, or prevention of disease, or maintaining, restoring, correcting or modifying any bodily function, with the requirement only that the physiologically active ingredient be capable of oral administration. Many physiologically active ingredients are included in the "Physicians Desk Reference" 56$^{th}$ edition and the "Physicians Desk Reference for Non-prescription Drugs and Nutritional Supplements" 23$^{rd}$ edition, both of which are hereby incorporated herein by reference.

A core forming mixture can be made by mixing gelatin with the at least one physiologically active ingredient and heating gelatin or a gelatin substitute such as vegetable starch with water and other ingredients that are well known to those skilled in the art to prepare a gelatinous material which has the requisite soft texture as well as sufficient integrity to hold together when submersed in water for at least one minute, preferably several minutes, and more preferably at least five minutes. The at least one physiologically active ingredient may be a single substance or a composition, and may be either soluble or insoluble in the core forming mixture. Insoluble materials are applied in a powder form dispersed in the core forming mixture. For gelatin based cores, the texture and integrity can be adjusted by adjusting the Bloom value of the gelatin used. Generally, it is preferred to use a gelatin with a Bloom value in the range of about 200–275 grams and a gelatin concentration in the range of about 7 to 10%.

Layers are added to the cores by conventional means such as dipping and spraying depending on the nature of the layers.

Morsels, preferably, have a diameter in the range from about 0.1-mm to about 10-mm, preferably 0.5 mm to 5 mm, and preferably will sink in water.

The density of the gelatinous core can conveniently be controlled by incorporating gas into the core forming mixture during the gel formation. Gas can be incorporated using the type of mixer that incorporates gas during the gel solidification. Alternatively gas can be injected into the formed cores.

Although the present invention has been described in considerable detail with reference to certain preferred versions thereof, other versions are possible. Therefore the spirit and scope of the appended claims should not be limited to the preferred versions herein.

What is claimed is:

1. A beverage mix for delivering an active agent comprising:
    an aqueous solution
    and a plurality of morsels located within the aqueous solution, each morsel comprising:
    a) a gelatinous core, said gelatinous core comprising at least one gel forming substance and at least one physiologically active ingredient;
    b) at least one effervescent type zone, the effervescent type zone accessible to the aqueous solution and
    c) at least one barrier type zone, wherein said at least one barrier type zone and said effervescent type zones are located outside said gelatinous core and wherein said at least one barrier type zones shields at least one of the at least one effervescent type zones.

2. The beverage mix of claim 1, wherein the at least one effervescent type zone comprises at least one effervescent type layer surrounding said gelatinous core, and wherein said at least one barrier type zone comprises at least one barrier type layer surrounding said gelatinous core, and wherein each of said at least one effervescent layers is in alternating relationship to a barrier type layer.

3. The beverage mix of claim 2 wherein the at least one effervescent type layer comprises a plurality of effervescent layers for delivering an active agent comprising a plurality of morsels, each morsel comprising:
    a) a gelatinous core, said gelatinous core comprising a substrate and at least one physiologically active ingredient
    b) at least one effervescent type zone; and
    c) at least one barrier type zone, wherein said at least one barrier type zone and said effervescent type zones are located outside said gelatinous core and wherein said at least one barrier type zones shields at least one of the at least one effervescent type zones.

4. The beverage mix of claim 1 wherein the at least one effervescent type zone and the at least one barrier type zone form at least one nodule surrounding the gelatinous core morsel further, said nodule comprise a colorant, whereby the colorant is released into the beverage mix as the morsel dissolves.

5. The beverage mix of claim 4 wherein the at least one nodule comprises a plurality of nodules.

6. The beverage mix of claim 1 wherein the at least one effervescent type zone comprises at least one effervescent pocket surrounded by said gelatinous core morsel and said pocket further comprises a flavoring, whereby the flavoring is released into the beverage mix as the morsel dissolves.

7. The beverage mix of claim 6 wherein the at least one effervescent pocket comprises a plurality of effervescent pockets.

8. The beverage mix of claim 1 A beverage mix for delivering an active agent comprising a plurality of morsels, each morsel comprising:
    a) a gelatinous core, said gelatinous core comprising at least one gel forming substance and at least one physiologically active ingredient;
    b) at least one effervescent type zone; and
    c) at least one barrier type zone, wherein said at least one barrier type zone and said effervescent type zones are located outside said gelatinous core and wherein said at least one barrier type zones shields at least one of the at least one effervescent type zones, wherein said at least one gel forming substance comprises a substance chosen from the group consisting of gelatin, vegetable starch, water-soluble cellulosic polymers, pectin, plasticizers, agar, carrageenan, glucomannan, scleroglucan, schizophyllan, gellan gum, alginic acid, and curd.

9. The beverage mix of claim 8 wherein the at least one effervescent type zone comprises a substance from the group consisting of alkali metal carbonates, alkali metal hydrogen carbonates, and ammonium carbonate.

10. The beverage mix of claim 9 wherein the at least one barrier type zone provides protection to an underlying effervescent type layer for at least 1 second after being exposed to water.

11. The beverage mix of claim 9 wherein the each of the plurality of morsels have a diameter in the range from 0.1 mm to 10 mm.

12. The beverage mix of claim 1 wherein said at least one physiologically active ingredient comprises a water-soluble component dissolved in said gelatinous core.

13. The beverage mix of claim 1 wherein said at least one physiologically active ingredient comprises a water insoluble component dispersed within said gelatinous core.

14. The beverage mix of claim 13 further comprising at least one additional physiologically active ingredient in addition to the at least one physiologically active ingredient present in said gelatinous core, wherein said at least one additional physiologically active ingredient is mixed into at least one of the plurality of effervescent type zones.

15. The beverage mix of claim 1 wherein said at least one effervescent type zone comprises at least one component that releases carbon dioxide when immersed in a liquid comprising water.

16. A beverage formed when the beverage mix of claim 1 is mixed with for delivering a physiologically active agent comprising:
   a. a liquid comprising water; and
   b. a plurality of morsels, the plurality of morsels mixed with the liquid, and each morsel comprising:
      i. a gelatinous core, said gelatinous core comprising at least one gel forming substance and at least one physiologically active ingredient
      ii. at least one effervescent type zone: and
      ii. at least one barrier type zone, wherein said at least one barrier type zone and said effervescent type zones are located outside said gelatinous core and wherein said at least one barrier type zones shields at least one of the at least one effervescent type zones.

17. A beverage mix for delivering an active agent comprising a plurality of morsels, each morsel comprising:
   a) a gelatinous core, said gelatinous core comprising at least one gel-forming substance and at least one physiologically active ingredient, wherein at least one physiologically active ingredient comprises a water-soluble component dissolved in said gelatinous core,
   b) at least one effervescent type zone:
   c) at least one barrier type zone, wherein said at least one barrier type zone and said effervescent type zones are located outside said gelatinous core and wherein said at least one barrier type zones shields at least one of the at least one effervescent type zones; and
   d) at least one additional physiologically active ingredient in addition to the at least one physiologically active ingredient present in said gelatinous core, wherein said at least one additional physiologically active ingredient is mixed into the at least one barrier type zone.

18. The beverage formed when the beverage mix of claim 17 is mixed with a liquid comprising water whereby the beverage delivers a dose comprising at least one water soluble physiologically active ingredient dissolved in the gelatinous core and at least one water soluble physiologically active ingredient dissolved in a carbonated solution.

19. A beverage mix comprising:
   a. a carbonated solution
   b. a plurality of morsels mixed with the carbonated solution, each morsel comprising:
      i. a gelatinous core, said gelatinous core comprising at least one gel forming substance and at least one physiologically active ingredient, and wherein said at least one physiologically active ingredient comprises a water insoluble component dispersed within said gelatinous core
      ii. at least one additional physiologically active ingredient in addition to the at least one physiologically active ingredient present in said gelatinous core, wherein said at least one additional physiologically active ingredient is nixed into at least one of the plurality of effervescent type zones
      iii. at least one effervescent type zone; and
      iv. at least one barrier type zone, wherein said at least one barrier type zone and said effervescent type zones are located outside said gelatinous core and wherein said at least one barrier type zones shields at least one of the at least one effervescent type zones, whereby the beverage mix delivers a dose comprising at least one water insoluble physiologically active ingredient dispersed in the gelatinous core and at least one water soluble physiologically active ingredient dissolved in the carbonated solution.

20. A Method of delivering at least one physiologically active ingredient comprising the acts of
   a) mixing said at least one physiologically active ingredient with a gel forming mixture comprising at least one gel forming substance under conditions where a gelatinous mass is formed,
   b) dividing the gelatinous mass into a plurality of gelatinous cores, and
   c) applying at least two effervescent layers and at least one barrier layers to a plurality of the plurality if gelatinous cores to form a plurality of morsels.

21. The method of claim 20 further comprising dispensing sufficient morsels to constitute a dose of said at least one physiologically active ingredient.

22. A method of dispensing a first physiologically active ingredient in a common dose with a second physiologically active ingredient which is water-soluble comprising the acts:
   a. mixing the first physiologically active ingredient into a mixture comprising at least one gel forming substance under conditions where a gelatinous mass is formed, wherein said gelatinous mass contains the first physiologically active material;
   b. Dividing the gelatinous mass into a plurality of gelatinous cores, and
   c. Applying a plurality of layers to a plurality of the gelatinous cores wherein the plurality of layers comprises as least two effervescent layers and at least one barrier layer, and wherein the first physiologically active ingredient is mixed with at least one of the plurality of layers, to form a plurality of morsels.

23. The method of claim 22 further comprising the act of dispensing sufficient morsels to constitute a combined dose of the first physiologically active ingredient and the second active ingredient, whereby when the sufficient morsels are added to a liquid comprising water a dose of the water-soluble physiologically active ingredient is dispensed in a carbonated water solution and a dose of the water-soluble ingredient is dispensed for contemporaneous consumption in the gelatinous cores.

24. The beverage prepared by combining the combined dose of claim 23 with a liquid comprising water.

* * * * *